Nov. 7, 1950     M. A. CLEMENT     2,529,375
SWITCHING DEVICE
Filed Sept. 28, 1945
FIG.1
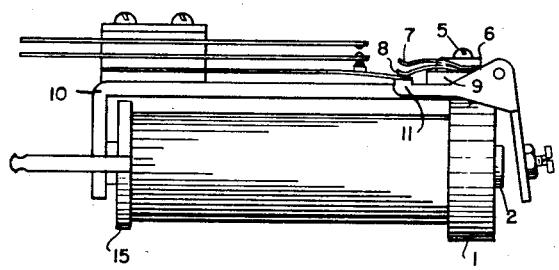
FIG.2     FIG.2a
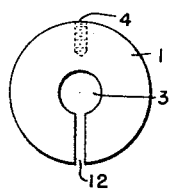 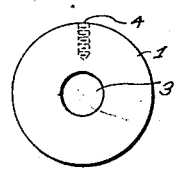
FIG.3
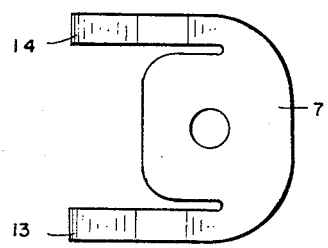
FIG.4
INVENTOR.
MILTON A. CLEMENT
BY
ATTORNEY Patented Nov. 7, 1950

2,529,375

UNITED STATES PATENT OFFICE 2,529,375

SWITCHING DEVICE

Milton A. Clement, Chicago, Ill., assignor to Automatic Electric Laboratories, Inc., Chicago, Ill., a corporation of Delaware Application September 28, 1945, Serial No. 619,107

1 Claim. (Cl. 200—104)

The present invention relates to switching devices and more particularly to electrical switch devices of the electromagnetic relay type. Such devices conventionally comprise a field structure including a core provided with a winding, a movable armature carried by the field structure, and one or more sets of switch springs operatively associated with the armature.

It is an object of the present invention to provide, in an electromagnetic relay, an improved field structure in which a coil anchoring member of non-magnetic material is employed to rigidly anchor the normally unattached armature end of the core to the heel piece which assures alignment of the coil core with one leg of the heel piece and maintains such alignment should the relay be subjected to shock or sustained vibration.

Another object of this invention is to provide, in a relay which does not require the slow-to-release feature, an anchoring ring which is equipped with a slot from its outside edge opposite the threaded hole, to the hole in the center of the ring, thus completely severing the ring, which prevents the ring from having any perceptible retarding effect on the armature when the coil is deenergized.

Another object of this invention is to provide two armature restoring springs which offer different degrees of pressure against the arm or arms of the armature during the movement of the armature when the coil is energized.

Another object of this invention is to provide a single screw in combination with a clamping washer and a threaded hole in the anchoring ring, whereby the two armature restoring springs, the armature retaining bracket, the relay heel piece and the coil anchoring ring are held firmly together.

The several features of this invention will be apparent from the following description taken in connection with the drawings which consist of five figures on one sheet.

Fig. 1 is a conventional relay, with armature and two armature restoring springs, and core anchoring ring.

Fig. 2 is the top view of the core anchoring ring showing the slot.

Fig. 2A is a top view of a core anchoring ring without a slot and which may be substituted for the ring of Fig. 2 when a relay having slow operating and releasing characteristics is desired.

Fig. 3 is a plan view of an armature restoring spring.

Fig. 4 is a side view of an armature restoring spring such as Fig. 3.

In Fig. 1 it will be noted that the coil anchoring ring 1 is fitted over the armature end of the core 2 and permanently occupies a portion of the core length. The opening 3, as seen in Fig. 2, in the ring is of such a diameter that it will fit tightly on the core end. The outside diameter of the ring 1 is slightly larger than the spool end 15 on the heel end of the core, so that the axis of the core will be aligned with the leg of the heel piece which is parallel to the core. It will be noted that the coil anchoring ring 1 has a threaded hole 4 for the reception of the end of screw 5. Screw 5 passes through clearance holes in clamping washer 6, two armature restoring springs 7 and 8 respectively, the armature retaining bracket 9, and heel piece 10 into the threaded hole 4 in the core retaining ring 1. By this arrangement there can be no change in relation between the core axis and the leg 10 of the heel piece. It will be noted also that the retaining ring 1 does not interfere in any way with the normal operation of the armature.

Fig. 2 is a top view of the core anchoring ring 1 and it will be noted that the slot 12, which completely severs the ring, is diametrically opposite the threaded hole 4. The severing of the ring by the slot 12 destroys the effect which the solid ring would have in retarding the release of the armature when the coil is deenergized. Should a relay require the slow releasing feature, the coil anchoring ring 1 would be provided without the slot 12.

In Fig. 3 it will be noted that the armature restoring spring 7 has two parallel projections 13 and 14 which may be adjusted as required in connection with an armature having either one or two arms 11. As seen in Fig. 1, it will be noted that the armature restoring spring 8 is adjusted to maintain slight pressure on the armature arm 11 when the coil is deenergized, which prevents (chattering) or false operation of the armature should the relay be subjected to shock or prolonged vibration. It will also be noted in Fig. 1 that the armature restoring spring 7 is adjusted so that the armature may move almost its full stroke before the pressure of spring 7 takes effect. This serves the purpose of providing an extra load on the armature, in addition to the load of the set of contact springs, which serves the purpose of producing a very quick release of the armature when the coil is deenergized.

In Fig. 4 it will be noted that the armature restoring spring 7 has its extension 13 adjusted to maintain slight pressure on armature arm 11 when the armature is in its normal position. These armature restoring springs are easily adjusted, as seen in Fig. 1 to exert pressure on the armature arm 11 at any convenient phase in the armature stroke between normal and fully operated position.

What is claimed is:

In an electromagnetic relay, an armature, a core having a coil thereon for energizing said core, a heelpiece secured at one end to said core and having another end supporting said armature adjacent the other end of said core, a first armature spring mounted on said other end of said core and normally tensioned against said armature when said coil is deenergized, a second armature spring mounted on said other end of said core and tensioned against said armature only when said armature is operated by the energization of said coil, a spring contact pile-up including switching contacts mounted on said one end of said heelpiece and operatively controlled by said armature for switching electrical circuits terminating in such switching spring contacts, an armature mounting bracket rotatably supporting said armature, and means including a collar around said other end of said core and a screw passing through said armature springs, said bracket, and the other end of said heelpiece into said collar for rigidly securing said armature springs, said bracket and the other end of said heelpiece to the other end of said core.

MILTON A. CLEMENT.

REFERENCES CITED

The following references are of record in the file of this patent:

UNITED STATES PATENTS

| Number | Name | Date |
|---|---|---|
| 512,386 | McBerty | Jan. 9, 1894 |
| 1,016,567 | Kaisling | Feb. 6, 1912 |
| 1,209,646 | Reed | Dec. 19, 1916 |
| 1,226,617 | Parker | May 15, 1917 |
| 1,850,374 | Bosh | Mar. 22, 1932 |
| 2,185,603 | Miller | Jan. 2, 1940 |
| 2,269,108 | Hubbell | Jan. 6, 1942 |
| 2,281,687 | Fowler | May 5, 1942 |
| 2,298,273 | Blattner | Oct. 13, 1942 |
| 2,307,922 | Dickten | Jan. 12, 1943 |
| 2,397,635 | Wood | Apr. 2, 1946 |
| 2,401,213 | Wood | May 28, 1946 |

OTHER REFERENCES

"Magnets," Underhill, pages 84–85, pub. 1924 by McGraw-Hill Book Co., New York.